(12) United States Patent
Choi et al.

(10) Patent No.: US 11,873,124 B2
(45) Date of Patent: Jan. 16, 2024

(54) AERO WIND POWER GENERATION APPARATUS

(71) Applicants: Hyundai Motor Company, Seoul (KR); Kia Corporation, Seoul (KR)

(72) Inventors: Jung Hun Choi, Hwaseong-Si (KR); Dong Hyun Ha, Seoul (KR); Jae Wung Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 51 days.

(21) Appl. No.: 17/852,101

(22) Filed: Jun. 28, 2022

(65) Prior Publication Data

US 2023/0227157 A1 Jul. 20, 2023

(30) Foreign Application Priority Data

Jan. 17, 2022 (KR) ........................ 10-2022-0006428

(51) Int. Cl.
*B64U 10/10* (2023.01)
*F03D 9/32* (2016.01)
(Continued)

(52) U.S. Cl.
CPC .............. *B64U 10/10* (2023.01); *B60L 8/006* (2013.01); *F03D 3/005* (2013.01); *F03D 9/32* (2016.05);
(Continued)

(58) Field of Classification Search
CPC ........ B64U 10/10; B64U 10/30; B64U 50/19; B64U 2101/10; F03D 9/32; F03D 9/322;
(Continued)

(56) References Cited

U.S. PATENT DOCUMENTS 10,844,839 B2    11/2020    von Flotow et al.
2007/0200027 A1*  8/2007    Johnson ................ B64C 39/022
                                                        244/3.1
(Continued)

FOREIGN PATENT DOCUMENTS

JP    1994-159224 A    6/1994
JP    2003-120511 A    4/2003
(Continued)

*Primary Examiner* — Viet P Nguyen
(74) *Attorney, Agent, or Firm* — MORGAN, LEWIS & BOCKIUS LLP

(57) ABSTRACT

An aero wind power generation apparatus includes: a drone unit including drone wings configured to make the aero wind power generation apparatus move and hover and a sensor unit configured to detect information for controlling the aero wind power generation apparatus; a buoyancy generation unit connected to the drone unit and including a side cover configured to open or close and a balloon provided inside the side cover, wherein the buoyancy generation unit is configured to enable injection of gas into or release of the gas from the balloon; and a power generation unit connected to the buoyancy generation unit and including a rotating unit with a plurality of blades, a blade control unit of adjusting the state of the blades, and a motor unit of converting kinetic energy transferred from the rotating unit into electrical energy.

20 Claims, 5 Drawing Sheets

(51) Int. Cl.
    *F03D 3/00*   (2006.01)
    *B60L 8/00*   (2006.01)
    *B64U 10/30*   (2023.01)
    *B64U 50/19*   (2023.01)
    *B64U 101/10*  (2023.01)

(52) U.S. Cl.
    CPC .............. *F03D 9/322* (2023.08); *B64U 10/30* (2023.01); *B64U 50/19* (2023.01); *B64U 2101/10* (2023.01); *F05B 2220/706* (2013.01); *Y02E 10/72* (2013.01)

(58) Field of Classification Search
    CPC .... F03D 3/005; B60L 8/006; F05B 2220/706; Y02E 10/72
    See application file for complete search history.

(56) References Cited

U.S. PATENT DOCUMENTS

| | | |
|---|---|---|
| 2016/0273519 A1 | 9/2016 | Vander et al. |
| 2023/0250798 A1* | 8/2023 | Choi ..................... F03D 5/00 290/44 |

FOREIGN PATENT DOCUMENTS

| | | |
|---|---|---|
| JP | 2016-084708 A | 5/2016 |
| KR | 20-0480582 Y | 6/2016 |
| KR | 10-1643143 B | 7/2016 |
| KR | 10-2019-0004176 A | 1/2019 |

\* cited by examiner

AERO WIND POWER GENERATION APPARATUS

CROSS-REFERENCE TO RELATED APPLICATIONS

The present application claims priority to Korean Patent Application No. 10-2022-0006428, filed Jan. 17, 2022, the entire contents of which is incorporated herein for all purposes by this reference.

BACKGROUND OF THE PRESENT DISCLOSURE

Field of the Present Disclosure

The present disclosure relates to an aero wind power generation apparatus.

Background

The description in this section merely provides background information related to the present disclosure and does not necessarily form the related art.

Environmentally friendly vehicles such as electric vehicles are being developed and commercialized. Charging electric vehicles takes longer than filling internal combustion engine vehicles with fuel. Nevertheless, in the case of passenger cars, they may be charged at charging stations typically found in parking lots of buildings or the like, while they are not in use (for example, at night).

On the other hand, commercial trucks are usually parked in remote areas on the outskirts of cities, which makes it hard to charge vehicles at charging stations when they are not in use (for example, at night). Also, there is no way to get electric power even if a self-charging cable is available because charging stations are hard to find on the outskirts of cities, and even if charging stations are provided outside of town, in terms of practicality, it is difficult for a commercial truck to always drive to the designated places to charge.

In general, the wind gets faster with altitude, and as the wind speed increases, wind power generation produces more electrical energy. Wind power generation at lower altitudes cannot produce enough electrical energy. Another problem is that the production of constant amounts of electrical energy depends on external variables such as weather conditions.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an aero wind power generation apparatus including: a drone unit including drone wings configured to make the aero wind power generation apparatus move and hover and a sensor unit configured to detect information for controlling the aero wind power generation apparatus; a buoyancy generation unit connected to the drone unit and including a side cover configured to open or close and a balloon provided inside the side cover, wherein the buoyancy generation unit is configured to enable injection of gas into or release of the gas from the balloon; and a power generation unit connected to the buoyancy generation unit and including a rotating unit with a plurality of blades, a blade control unit configured for adjusting the state of the blades, and a motor unit engaged to the rotating unit and configured for converting kinetic energy transferred from the rotating unit into electrical energy.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
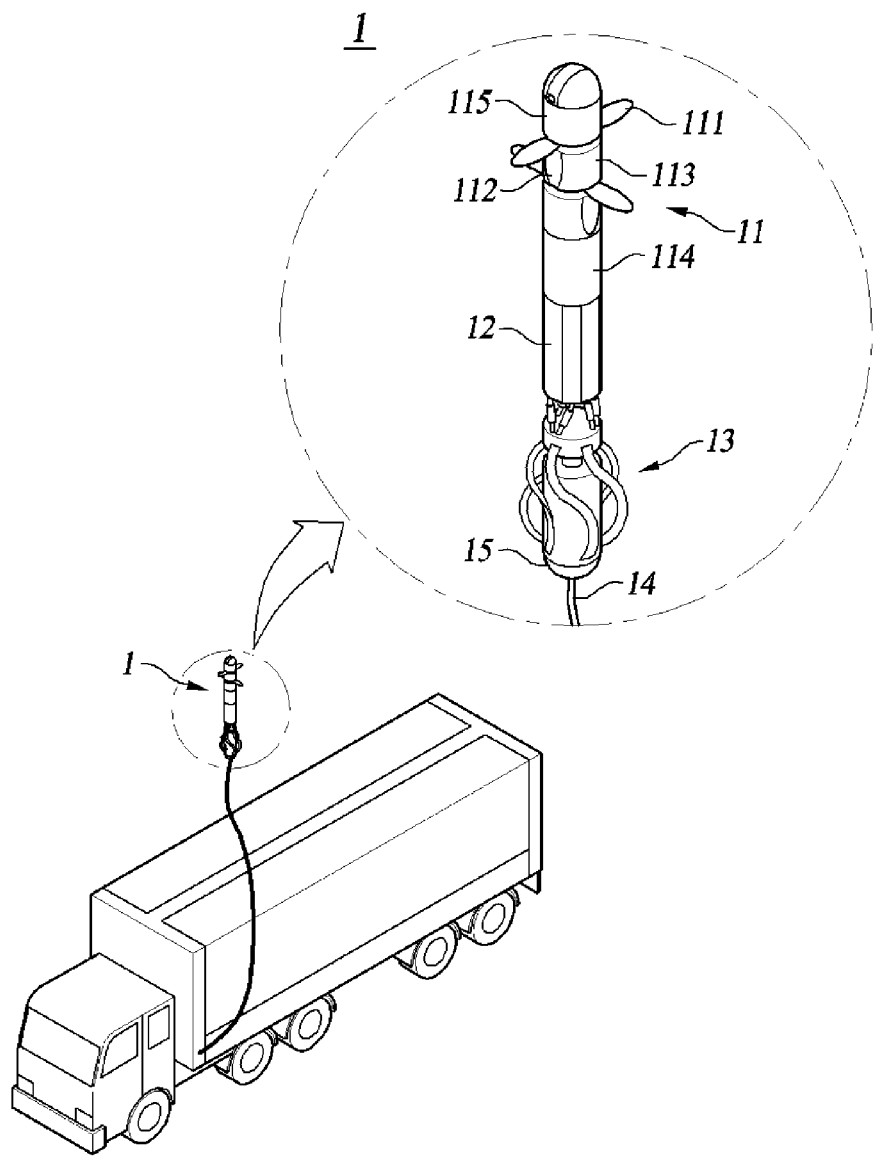
FIG. 1 is a perspective view of how an aero wind power generation apparatus is coupled according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An aero wind power generation apparatus according to various exemplary embodiments of the present disclosure may allow vehicles to be charged at all times by converting wind power energy into electrical energy.

An aero wind power generation apparatus according to various exemplary embodiments of the present disclosure may produce electrical energy by use of high-altitude, high-speed winds and moving depending on weather conditions.

The aspects of the present disclosure are not limited to the foregoing, and other aspects not mentioned herein will be able to be clearly understood by those skilled in the art from the following description.

Hereinafter, various exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of related known components and functions when considered to obscure the subject of the present disclosure will be omitted for clarity and for brevity.

Additionally, alphanumeric codes such as first, second, i), ii), (a), (b), etc., in numbering components are used solely for differentiating one component from the other but not to imply or suggest the substances, the order, or sequence of the components. Throughout the present specification, when parts "include" or "comprise" a component, they are meant to further include other components, not excluding thereof unless there is a description contrary thereto.

FIG. 1 is a perspective view of how an aero wind power generation apparatus is coupled according to an exemplary embodiment of the present disclosure.

Referring to FIG. 1, an aero wind power generation apparatus 1 of the present disclosure may include all or part of a drone unit 11, a buoyancy generation unit 12, a power generation unit 13, a cable 14, and a magnet 15.

The aero wind power generation apparatus 1 may convert wind energy into electrical energy in the air, and charge a vehicle's battery directly by use of the electrical energy and transmit produced electrical energy to a plant or a charging station. Thus, a vehicle provided with the aero wind power generation apparatus 1 does not have to be driven to a charging station and therefore may be charged anywhere regardless of location. Also, the plant or charging station may use the electrical energy produced by the aero wind power generation apparatus 1 in a variety of ways, including for selling the energy or producing hydrogen through water electrolysis using electrical energy and selling it.

The aero wind power generation apparatus 1 may produce electrical energy by use of good quality wind at or below an altitude limits of 150 m. It is possible to efficiently produce electrical energy within a short time period by use of high-altitude, high-speed winds. Also, the aero wind power generation apparatus 1 may move in terms of altitude and location depending on external variables such as weather conditions, for efficient production of electrical energy.

For the aero wind power generation apparatus 1 to produce electrical energy, the drone unit 11 may control the aero wind power generation apparatus 1 so that the aero wind power generation apparatus 1 takes off and hovers. Hovering refers to the state in which an aircraft, a drone, etc. stays in the same position at a certain altitude.

The buoyancy generation unit 12 may assist the drone unit 11 in controlling the aero wind power generation apparatus 1 to take off and hover. The buoyancy generation unit 12 may cause the aero wind power generation apparatus 1 to float by use of a gas having a lower density than air, such as helium gas. An upper end portion of the buoyancy generation unit 12 may be coupled to the drone unit 11, and the other end portion may be coupled to the power generation unit 13.

The power generation unit 13 may convert wind energy caused by a wind up in the air. It may convert wind energy into rotational kinetic energy and convert the rotational kinetic energy into electrical energy. Electrical energy produced by the power generation unit 13 may be transmitted to a vehicle, a plant, or a charging station by use of the cable 14. One end portion of the cable 14 may be connected to the aero wind power generation apparatus 1, and the other end portion may be connected to a vehicle, a plant, or a charging station. The cable may be flexible type to minimize damage from weather events.

The aero wind power generation apparatus 1 may be in the shape of a pillar in which the drone unit 11, the buoyancy generation unit 12, the power generation unit 13, and the magnet 15 are sequentially coupled from the top. The magnet 15 may be coupled to a bottom portion of the power generation unit 13, that is, an end portion of the aero wind power generation apparatus 1, so that the aero wind power generation apparatus 1 is docked to a vehicle, a plant or a charging station. The shape and order of coupling of the aero wind power generation apparatus 1 are not limited to this, and may be coupled in various ways as needed.

Figure 2:
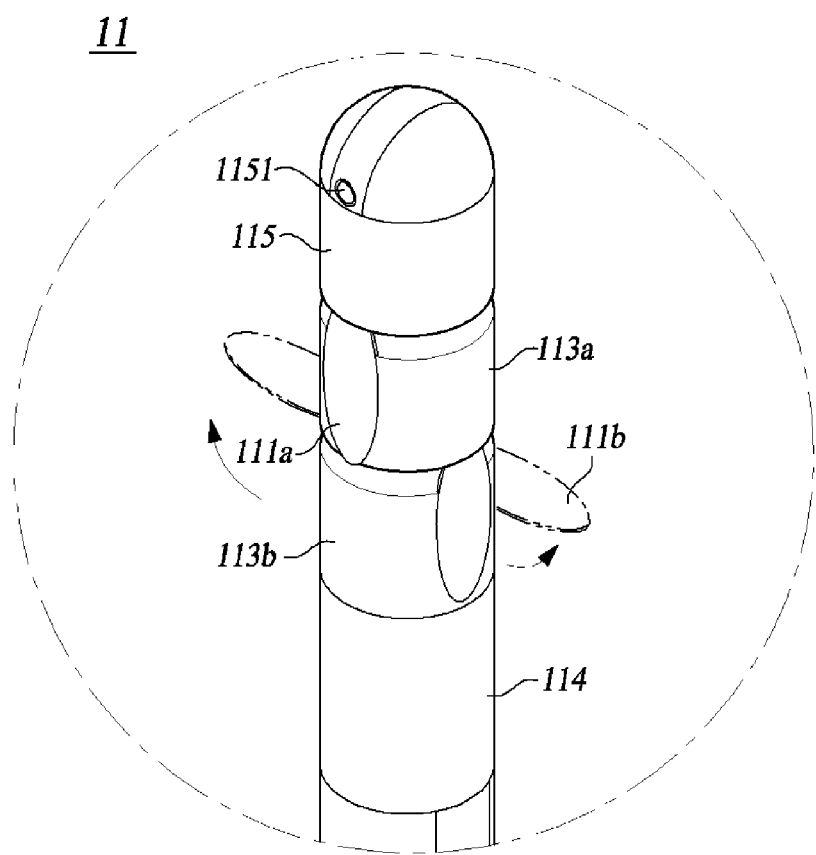
FIG. 2 is an enlarged view of a drone unit of an aero wind power generation apparatus according to an exemplary embodiment of the present disclosure.

FIG. 2 is an enlarged view of a drone unit of an aero wind power generation apparatus according to an exemplary embodiment of the present disclosure.

Referring to FIG. 2, the drone unit 11 may include all or part of drone wings 111, wing grooves 112, drone motors 113, a battery unit 114, a sensor unit 115, and a drone controller.

The drone wings 111 may have a multi-rotor structure including a pair of first drone wings 111a and a pair of second drone wings 111b. The pair of first drone wings 111a may be coupled in such a way as to have a phase difference of 90 degrees from the pair of second drone wings 111b. Depending on the hovering performance required, the drone unit 11 may include one to eight pairs of drone wings 111.

The drone wings 111 may be configured to spread when the aero wind power generation apparatus 1 takes off or hovers and to be collapsible while coupled to a vehicle or the like. A plurality of wing grooves 112 may be formed on one side of the drone unit 11 so that the drone wings 11 are collapsible. The wing grooves 112 may be formed at a predetermined depth on one side of the drone unit 11, corresponding to the number and shape of the drone wings 111.

The drone motors 113 may include a first drone motor 113a configured to control the first drone wings 111a and a second drone motor 113b configured to control the second drone wings 111b. The drone motors 113 may control the drone wings 111 so that the aero wind power generation apparatus 1 takes off, hovers, and moves.

The battery unit 114 may be provided at a bottom portion of the drone unit 11. The battery unit 114 may include a plurality of batteries configured to supply electric power to the drone motors 113. The batteries may be high-density lithium polymer batteries with a voltage rating of 3.7 V, and 6-cell lithium polymer batteries may be mounted on the battery unit 114.

The sensor unit 115 may include all or part of a camera 1151, a hygrometer, a wind gauge, an accelerometer, a gyro, and an ultra-wide band (UWB) sensor.

The camera 1151 may detect objects around the aero wind power generation apparatus 1 to prevent collision with surrounding objects. The camera 1151 may be coupled at the top portion of the drone unit 11 to rotate 360 degrees. The hygrometer may monitor humidity with respect to the altitude of the aero wind power generation apparatus 1. The wind gauge may assist in controlling blades 1321 and a reducer 1323 of the power generation unit 13 by monitoring wind strength. The accelerometer and the gyro may provide a target hovering value for the aero wind power generation apparatus 1 in preparation for weather conditions (e.g., strong wind) by measuring the acceleration of the aero wind power generation apparatus 1. The UWB sensor may measure the lateral position of the aero wind power generation apparatus 1 so that the aero wind power generation apparatus 1 makes an accurate landing.

The drone controller may be configured to control the drone unit 11 by use of information detected by the sensor unit 115. For example, the drone controller may use information detected by the sensor unit 115 and control the drone wings 111 and the drone motors 113, for the aero wind power generation apparatus 1 to take off, hover, and move.

Figure 3:
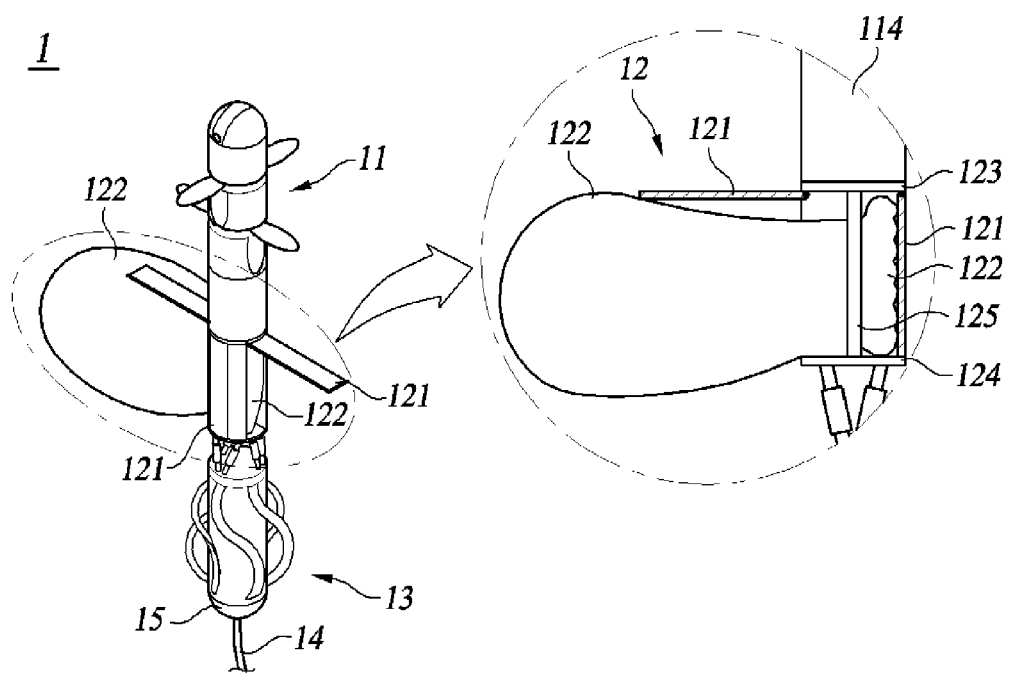
FIG. 3 is an enlarged view of a buoyancy generation unit of an aero wind power generation apparatus according to an exemplary embodiment of the present disclosure.

FIG. 3 is an enlarged view of a buoyancy generation unit of an aero wind power generation apparatus according to an exemplary embodiment of the present disclosure.

Referring to FIG. 3, the buoyancy generation unit 12 may include all or part of a side cover 121, a balloon 122, an upper cover 123, a lower cover 124, and a support 125.

The side cover 121 may form an external side of the buoyancy generation unit 12. The upper cover 123 may be positioned in an upper portion of the buoyancy generation unit 12 and coupled to the drone unit 11, and the lower cover 124 may be positioned in a lower portion of the buoyancy generation unit 12 and coupled to the power generation unit 13. The support 125 may be coupled between the upper cover 123 and the lower cover 124 and support the buoyancy generation unit 12 when the side cover 121 is opened.

The side cover 121 may be configured to open or close as the aero wind power generation apparatus 1 takes off and lands. The side cover 121 may be configured so that the external side of the buoyancy generation unit 12 opens or closes in four sections. All or part of the sections of the side cover 121 may be opened if necessary. The side cover 121 may be opened as it spreads out over the buoyancy generation unit 12. That is, when the side cover 121 opens, the side cover 121 and the upper cover 123 may remain coupled to each other, and the side cover 121 and the lower cover 124 may be decoupled from each other.

A gas lighter than air, such as helium gas, may be injected into the balloon 122. When the aero wind power generation apparatus 1 takes off or hovers, the balloon 122 may be filled up with helium gas. The balloon 122 filled with helium gas may assist the aero wind power generation apparatus 1 in saving energy consumed for take off and hovering of the aero wind power generation apparatus 1. The buoyancy generation unit 12 may further include a gas inlet for injecting helium gas into the balloon 122 and a gas outlet for releasing helium gas. Also, the balloon 122 may be made of a urethane material with high durability to prevent damage from a weather condition or collision with other objects.

The balloon 122 may be provided inside the side cover 12, and when the aero wind power generation apparatus 1 takes off, the side cover 121 may be opened, and helium gas may be injected into the balloon 122. When the aero wind power generation apparatus 1 lands, the helium gas may be released from the balloon 122, and the side cover 121 may be closed. The volume of the balloon 122 may be so that the balloon 122 filled up with helium gas has a buoyancy greater than the weight of the aero wind power generation apparatus 1.

Figure 4:
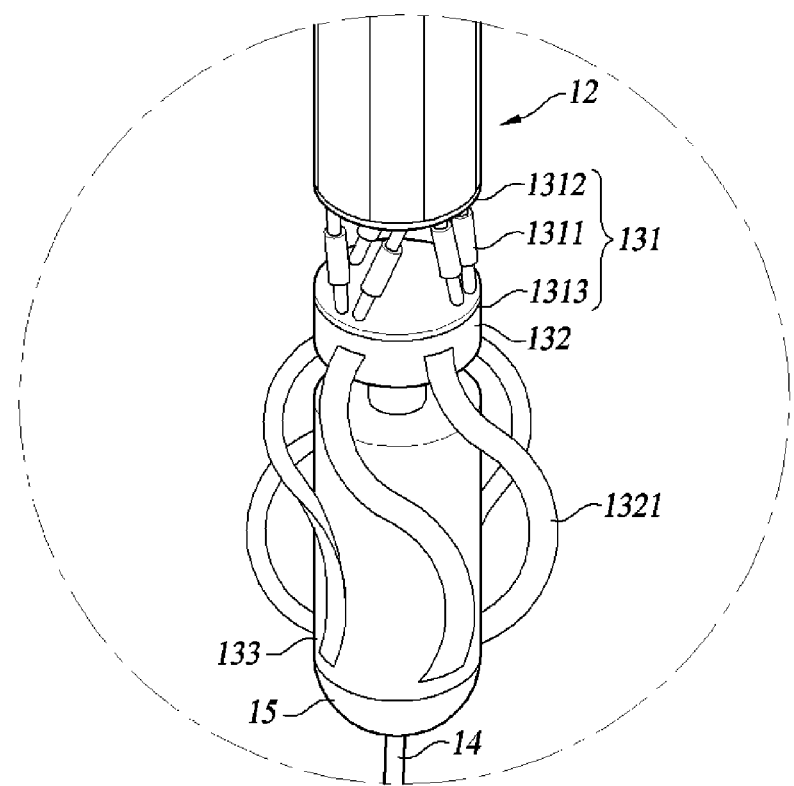
FIG. 4 is an enlarged view of a power generation unit of an aero wind power generation apparatus according to an exemplary embodiment of the present disclosure.

FIG. 4 is an enlarged view of a power generation unit of an aero wind power generation apparatus according to an exemplary embodiment of the present disclosure.

Figure 5:
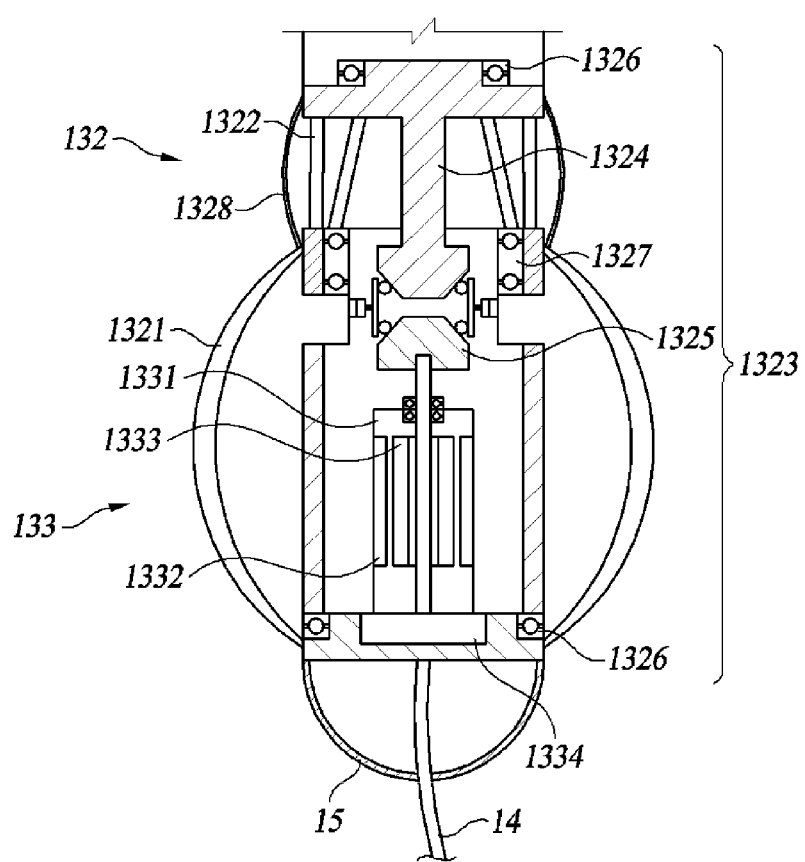
FIG. 5 is a cross-sectional view of a rotating unit and a motor unit of an aero wind power generation apparatus according to an exemplary embodiment of the present disclosure.

FIG. 5 is a cross-sectional view of a rotating unit and a motor unit of an aero wind power generation apparatus according to an exemplary embodiment of the present disclosure.

Referring to FIG. 4 and FIG. 5, the power generation unit 13 may include all or part of a blade control unit 131, a rotating unit 132, and a motor unit 133.

The blade control unit 131 may be coupled to a bottom portion of the buoyancy generation unit 12, and the rotating unit 132 and the motor unit 133 may be sequentially coupled to a bottom portion of the blade control unit 131. As the rotating unit 132 coupled to the blades 1321 rotates by wind, wind energy may be converted into rotational kinetic energy. The rotating unit 132 may transfer the rotational kinetic energy to the motor unit 133, and the motor unit 133 may convert the rotational kinetic energy into electrical energy. In the present instance, the blade control unit 131 may control the heights, surface areas, and angles of the blades 1321 and the distances between the blades 1321 in real time in conjunction with the strength of wind up in the air and the amount of electrical energy production.

The blade control unit 131 may include all or part of an actuator 1311, an upper plate 1312, and a lower plate 1313.

The upper plate 1312 may be coupled to the buoyancy generation unit 12, and the lower plate 1313 may be coupled to the rotating unit 132 of the power generation unit 13. The actuator 1311 may be coupled between the upper plate 1312 and the lower plate 1313. The blade control unit 131 may have a hexapod structure including 6 actuators 1311. The hexapod structure is a structure having six degrees of freedom, which may allow the blade control unit 131 to operate with precision. However, the structure of the blade control unit 131 is not limited to this, and the number of degrees of freedom may be variously changed as necessary.

The rotating unit 132 may include all or part of the blades 1321, a blade adjuster 1322, the reducer 1323, and a dust cover 1328.

The aero wind power generation apparatus 1 of the present disclosure may be formed by coupling the blades 1321 and the power generation unit 13 in an integrated fashion. The blades 1321 may be vertical wind blades, one end portion of which is coupled to an upper end portion of the power generation unit 13, and the other end portion thereof is coupled to a lower end portion of the power generation unit 13. That is, one end portion of the blades 1321 may be coupled to an external surface of the rotating unit 132, and the other end portion of the blades 1321 may be coupled to an external surface of the motor unit 133. The blades 1321 may be coupled at predetermined intervals along an external surface of the power generation unit 13. For example, six blades 1321 may be coupled at equal intervals along the external surface of the power generation unit 13.

The blades 1321 may be made of high-density urethane or aluminum. Also, the shape, type, and number of blades 1321 may vary depending on weather conditions and location.

The blade adjuster 1322 may be connected to the blade control unit 131 and the blades 1321 and adjust the heights, surface areas, and angles of the blades 1321 and the distances between the blades 1321. The dust cover 1328 may be coupled to cover the top portion of the blades 1321 and the blade adjuster 1322.

The reducer 1323 may include all or part of an input shaft 1324, an output shaft 1325, a rotary bearing 1326, and a linear bearing 1327.

The input shaft 1324 may be provided in the rotating unit 132, and the output shaft 1325 may be provided in the motor unit 133, so that the rotational kinetic energy of the rotating unit 132 may be transferred to the motor unit 133. In the present instance, the reducer 1323 may be a stepless reducer which is configured for steplessly shifting gears. The motor unit 133 may reduce electrical energy according to the torque and number of rotations varied by the reducer 1323.

The motor unit 133 may include all or part of a power generation motor 1331 and a generation controller 1334.

A rotor 1333 may rotate along with the rotation of the output shaft 1325, and electrical energy may be generated by a magnetic force between the rotor 1333 and a stator 1332 surrounding the rotor 1333.

The generation control unit 1334 may control the power generation motor 1331 and the blade control unit 131. The generation unit 1334 may control the power generation motor 1331 and the blade control unit 131 in accordance with weather conditions and the amount of production of electrical energy, by use of information detected from the sensor unit 115 of the drone unit 11 or a terrestrial sensor. That is, the generation controller 1334 may control the amount of production of electrical energy and the state of the blades 1321 by controlling the power generation motor 1331 and the blade control unit 131.

According to an exemplary embodiment of the present disclosure, exemplary embodiment of the present disclosure, an aero wind power generation apparatus may be mounted in a vehicle and has an effect of converting wind power energy into electrical energy and charging the vehicle regardless of time and place.

According to an exemplary embodiment of the present disclosure, exemplary embodiment of the present disclosure, an aero wind power generation apparatus has an effect of effectively producing electrical energy by use of high-altitude, high-speed winds and moving depending on weather conditions.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An aero wind power generation apparatus comprising:
    a drone unit including drone wings configured to make the aero wind power generation apparatus move and hover, and a sensor unit configured to detect information for controlling the aero wind power generation apparatus;
    a buoyancy generation unit connected to the drone unit and including a side cover configured to open or close and a balloon provided inside the side cover, wherein the buoyancy generation unit is configured to enable injection of gas into or release of the gas from the balloon; and
    a power generation unit connected to the buoyancy generation unit and including:
        a rotating unit with a plurality of blades;
        a blade control unit configured for adjusting a state of the blades; and
        a motor unit engaged to the rotating unit and configured for converting kinetic energy transferred from the rotating unit into electrical energy.

2. The aero wind power generation apparatus of claim 1, wherein the drone wings include:
 a pair of first drone wings configured to be collapsible from a predetermined position; and
 a pair of second drone wings configured to be collapsible from a predetermined position, with a phase difference of 90 degrees from the first drone wings.

3. The aero wind power generation apparatus of claim 2, wherein the drone unit further includes:
 a first drone motor engaged to the first drone wings and configured to control the first drone wings; and
 a second drone motor engaged to the second drone wings and configured to control the second drone wings.

4. The aero wind power generation apparatus of claim 3, wherein the drone unit further includes a battery unit connected to the first drone motor and the second drone motor and configured to supply electric power to the first drone motor and the second drone motor.

5. The aero wind power generation apparatus of claim 2, wherein the drone unit further includes wing grooves in which the first drone wings and the second drone wings are selectively inserted.

6. The aero wind power generation apparatus of claim 1, wherein the sensor unit includes at least one of a camera, a hygrometer, a wind gauge, an accelerometer, a gyro, and a UWB sensor.

7. The aero wind power generation apparatus of claim 1, wherein the side cover is configured to open when the aero wind power generation unit takes off from a predetermined location and to close when the aero wind power generation unit lands to a predetermined location.

8. The aero wind power generation apparatus of claim 1, wherein the gas is helium gas, and
 wherein the helium gas is injected into the balloon when the aero wind power generation unit takes off from a predetermined location, and the helium gas is released from the balloon when the aero wind power generation unit lands to a predetermined location.

9. The aero wind power generation apparatus of claim 1, wherein the balloon is made of a urethane material.

10. The aero wind power generation apparatus of claim 1, wherein the buoyancy generation unit further includes:
 an upper cover coupled to the drone unit;
 a lower cover coupled to the power generation unit; and
 a support supporting the buoyancy generation unit between the upper cover and the lower cover.

11. The aero wind power generation apparatus of claim 1, wherein the blade control unit has a hexapod structure including six actuators.

12. The aero wind power generation apparatus of claim 1, wherein the blade control unit is configured to adjust at least one of heights, surface areas, and angles of the blades and distances between the blades.

13. The aero wind power generation apparatus of claim 1, wherein the blades are vertical wind blades, a first end portion of which are coupled to an upper end portion of the power generation unit, and a second end portion thereof is coupled to a lower end portion of the power generation unit.

14. The aero wind power generation apparatus of claim 13, wherein the blades are coupled at predetermined intervals along an external surface of the power generation unit in a circumferential direction thereof.

15. The aero wind power generation apparatus of claim 1, wherein the blades are made of urethane or aluminum.

16. The aero wind power generation apparatus of claim 1, wherein the power generation unit includes a reducer configured to transfer the kinetic energy of the rotating unit to the motor unit.

17. The aero wind power generation apparatus of claim 16, wherein an input shaft provided in the rotating unit and an output shaft provided in the motor unit are engaged to each other by the reducer.

18. The aero wind power generation apparatus of claim 16, wherein the motor unit includes a power generation motor engaged to the output shaft and configured for producing the electrical energy by use of the kinetic energy transferred from the reducer.

19. The aero wind power generation apparatus of claim 1, further including a magnet at a bottom portion of the power generation unit, and configured to be docked to a member including a vehicle or a charging station.

20. The aero wind power generation apparatus of claim 1, further including a cable, wherein a first end portion of the cable is connected to the power generation unit and a second end portion of the cable is connected to a member including a vehicle or a charging station.

\* \* \* \* \*